US006957076B2

(12) United States Patent
Hunzinger

(10) Patent No.: US 6,957,076 B2
(45) Date of Patent: Oct. 18, 2005

(54) LOCATION SPECIFIC REMINDERS FOR WIRELESS MOBILES

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 487 days.

(21) Appl. No.: 09/998,945

(22) Filed: Nov. 15, 2001

(65) Prior Publication Data

US 2002/0086680 A1 Jul. 4, 2002

Related U.S. Application Data

(60) Provisional application No. 60/252,995, filed on Nov. 22, 2000.

(51) Int. Cl.[7] .............................................. H04Q 7/20
(52) U.S. Cl. ................................. 455/456.3; 455/456.2
(58) Field of Search .......................... 455/456.1, 456.2, 455/456.3, 456.6, 457, 458, 460, 461, 462, 455/18, 459, 414.1, 414.2, 412.2; 340/825.49, 340/825.69, 905, 902, 904, 995, 996; 342/357; 701/208–211, 201

(56) References Cited

U.S. PATENT DOCUMENTS

| 6,177,905 B1 * | 1/2001 | Welch .................... 342/357.13 |
| 6,205,326 B1 * | 3/2001 | Tell et al. .................... 455/406 |
| 6,351,647 B1 * | 2/2002 | Gustafsson .................. 455/466 |
| 6,360,101 B1 * | 3/2002 | Irvin ....................... 455/456.6 |
| 6,400,956 B1 * | 6/2002 | Richton .................... 455/456.3 |
| 6,542,743 B1 * | 4/2003 | Soliman ..................... 455/436 |
| 6,563,430 B1 * | 5/2003 | Kemink et al. ........ 340/825.49 |
| 6,650,902 B1 * | 11/2003 | Richton .................... 455/456.3 |
| 6,731,940 B1 * | 5/2004 | Nagendran ............... 455/456.1 |

* cited by examiner

Primary Examiner—Jean Gelin
(74) Attorney, Agent, or Firm—Harness, Dickey & Pierce, PLC

(57) ABSTRACT

A system allows users of wireless mobile terminals to set reminders, alerts, or other actions to be triggered based on location or dynamics. Such location information may include, but is not limited to, a specific location description such as latitude, longitude and a radius describing a generally circular region in which the terminal is located. The system monitors the location information until the programmed conditions are satisfied. Once the location condition is satisfied the system of the present invention triggers the programmed reminder.

22 Claims, 4 Drawing Sheets

LOCATION SPECIFIC REMINDERS FOR WIRELESS MOBILES

CROSS-REFERENCE TO RELATED APPLICATIONS

This application claims benefit of U.S. Provisional application No. 60/252,995, filed Nov. 22, 2000, the content of which is herein incorporated by reference in its entirety.

TECHNICAL FIELD

This invention relates to wireless communication systems, and more particularly to providing a system that allows wireless communication system mobile terminal users to set reminders or actions in general to occur or be triggered based on a wireless terminal's location or location dynamics.

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

Wireless communication systems are beginning to incorporate network-based and network-assisted location determination systems. Some wireless handsets have network assisted GPS capability. Some CDMA wireless handsets make use of the wireless communication signals themselves to perform location-related measurements such as in Enhanced Forward Link Trilateration (EFLT) or Advanced Forward Link Trilateration (AFLT) which use the difference in phase delays of wireless signals as input to location calculations. Other wireless communication systems, such as some telematics products incorporate stand-alone capabilities such as GPS. Wireless terminals without location capabilities may also have access to location related information. For example, the base station that a mobile station communicates with may have a unique identifier that identifies that particular base station to the mobile or signal conditions may be recognized from past observations. These types of information inherently identify the mobile general location as being the same as at some prior time.

Location information can be used to enable location-based services. Similarly, location-based services can be network or terminal based or distributed between wireless communication system entities. Distributed or network based services generally require active communication and use of wireless resources such as communication channels. For example, the TIA/EIA location protocol standard IS-801 enables network-assisted GPS via messaging over the CDMA wireless link between infrastructure and terminals. Such resources may be expensive, limited and have quality of service impacts on usage such as moderate or high latency. The present invention focuses on both overcoming the necessity for using wireless communication connections to supply position location, such as network assisted, network based or standalone position location technologies, as well as providing a practical location-based service to terminal users.

SUMMARY

The present invention provides a system that allows users of wireless mobile terminals to set reminders, alerts, or other actions to be triggered based on location or dynamics. Consider for example, that a user of a wireless handset realizes that he or she wants to pick up some groceries on the way home as he or she passes a grocery store on the way to work. Using the present invention, the user can command the terminal to set a reminder in the form of, for example, a voice memo "buy groceries". The user may then select that this reminder be played back upon re-entering the current general location. At this point, the invention stores information relating to the current location and begins monitoring. Such location information may include, but is not limited to, a specific location description such as latitude, longitude and a radius describing a generally circular region in which the terminal is located. Alternatively, such location information may include location-related information such as base station or sector identification or signal condition profiles. The system of the present invention monitors the location information until the programmed conditions are satisfied. In the example considered above, this would translate to detecting that the terminal left the area where the reminder was programmed and then re-entered that area. Once the location condition is satisfied the system of the present invention triggers the programmed reminder which, in the example considered, involves playing back a voice memo recording for the user.

An example of a stored location reminder consists of a recorded voice memo saying "pick up schematics from factory" associated with location information describing the general location of the factory and orientation information specifying that the reminder should only be triggered upon entering the factory area.

These and other features and advantages of the invention will become more apparent upon reading the following detailed description and upon reference to the accompanying drawings.

DETAILED DESCRIPTION

Figure 1A:
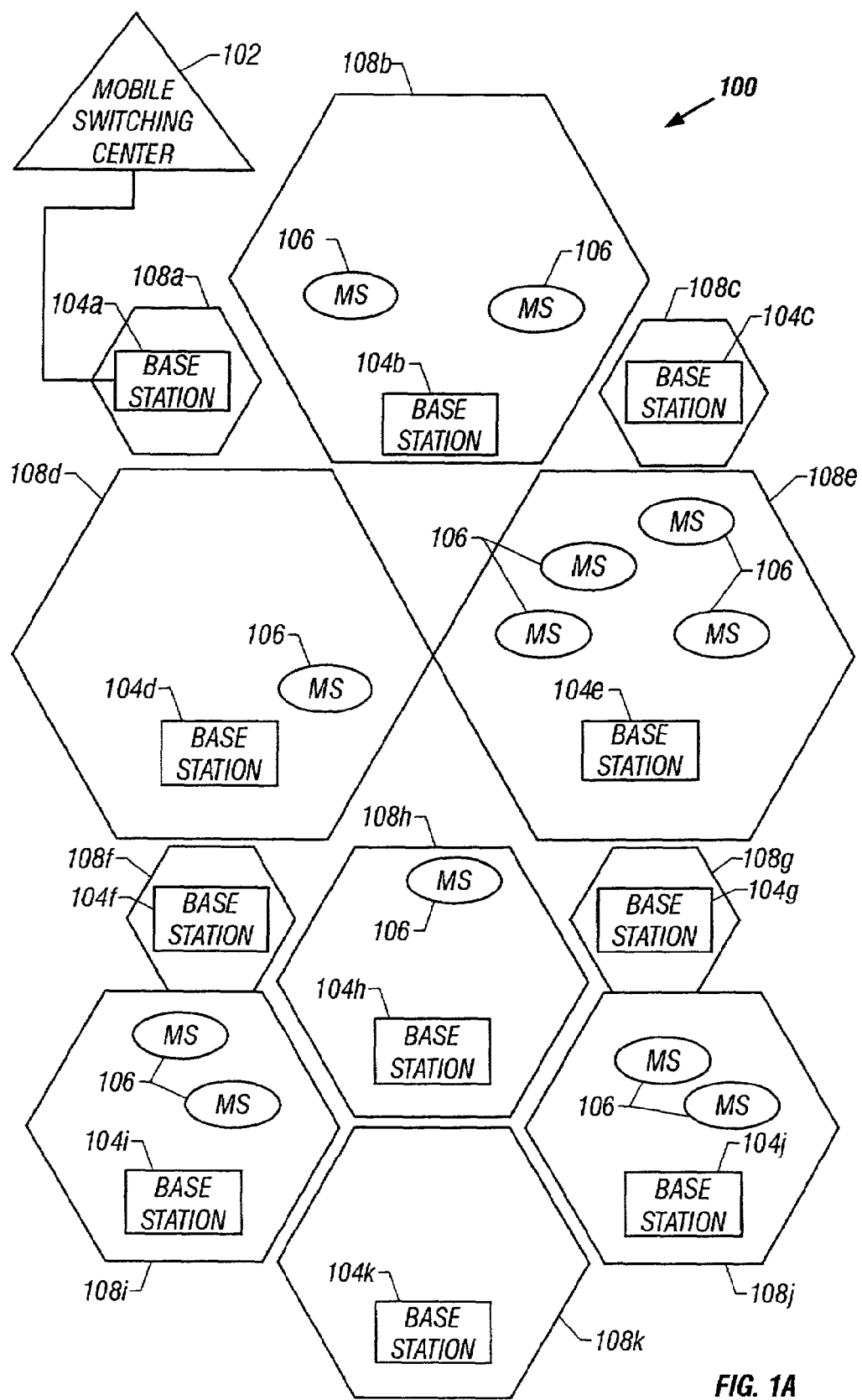
FIG. 1A illustrates components of a wireless communication system appropriate for use with an embodiment of the invention.

FIG. 1A illustrates components of an exemplary wireless communication system. A mobile switching center 102 communicates with base stations 104a–104k (only one connection shown). The base stations 104a–104k (generally 104) broadcasts data to and receives data from mobile terminals 106 within cells 108a–108k (generally 108). The cell 108 is a geographic region, roughly hexagonal, having a radius of up to 35 kilometers or possibly more.

A mobile terminal 106 is capable of receiving data from and transmitting data to a base station 104. In one embodiment, the mobile terminal 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile terminals 106 to cross cell boundaries without interrupting communications. This is so because base stations 104a, 104c, 104d, and 104e in adjacent cells assume the task of transmitting and receiving data for the mobile terminals 106. The mobile switching center 102 coordinates all communication to and from mobile terminals 106 in a multi-cell region. Thus, the mobile switching center 102 may communicate with many base stations 104.

Mobile terminals 106 may move about freely within the cell 108 while communicating either voice or data. Mobile terminals 106 not in active communication with other telephone system users may, nevertheless, scan base station 104 transmissions in the cell 108 to detect any telephone calls or paging messages directed to the mobile terminal 106.

One example of such a mobile terminal 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

Figure 1B:
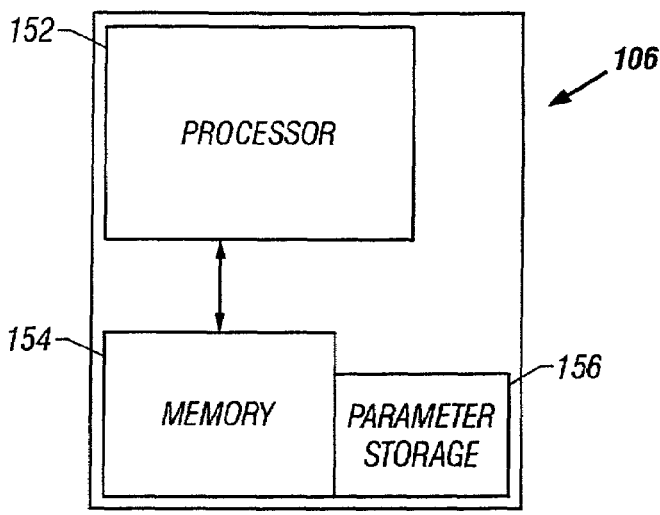
FIG. 1B is a block diagram showing features of a mobile station according to one embodiment of the invention.

FIG. 1B shows a block diagram of the mobile terminal 106, including a processor 152 and memory 154. The processor 152 may be driven by a program stored in the memory 154. A portion of memory 156 may be used to store various parameters.

Figure 2:
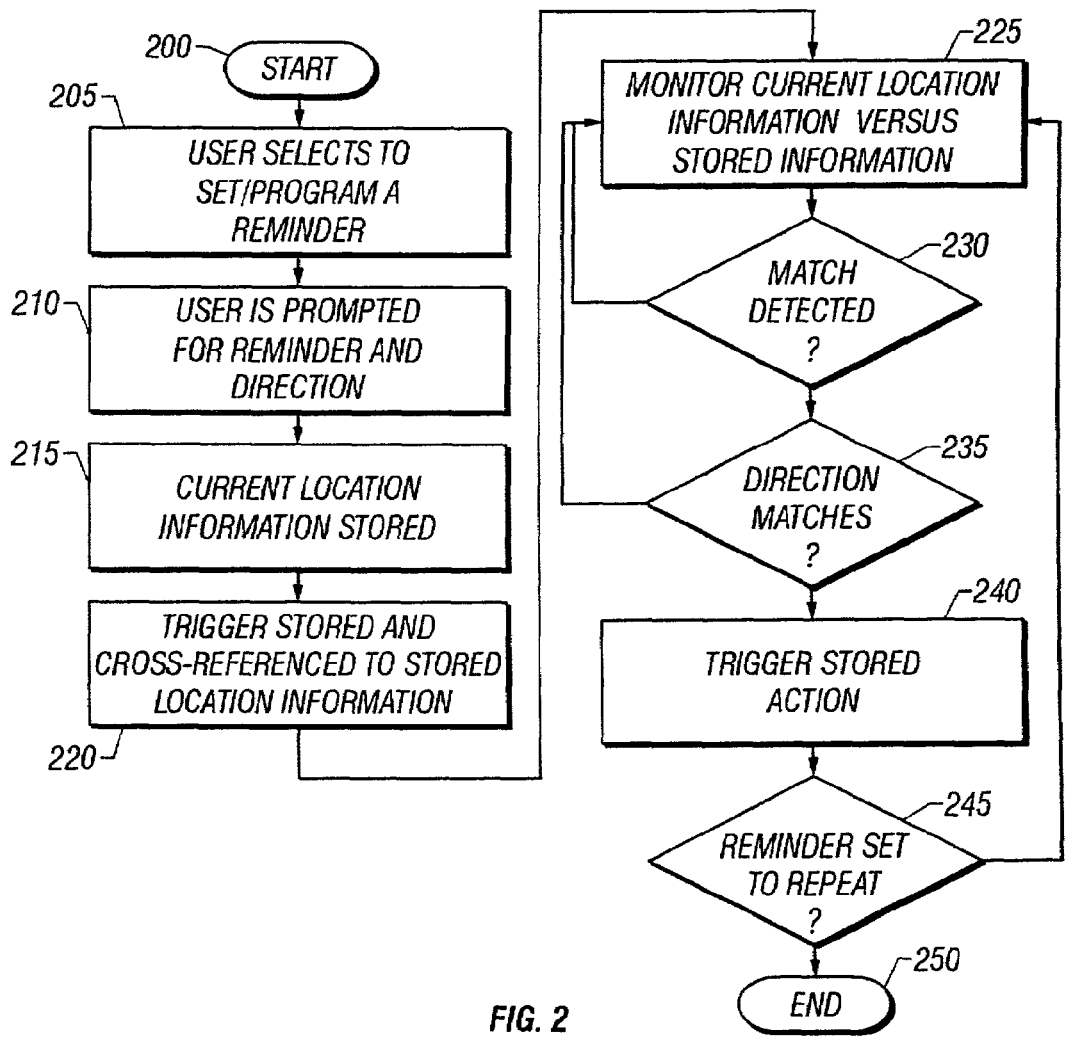
FIG. 2 is a flow chart illustrating location reminder programming, monitoring and triggering procedures according to one embodiment of the present invention.

FIG. 2 is a flow chart illustrating location reminder programming, monitoring and triggering procedures according to one embodiment of the present invention. The procedure is executed on a mobile terminal with or without position location technology. The mobile terminal has some type of user-interface that is capable of allowing selecting or programming reminders alerts, or actions.

The mobile terminal also includes memory for storing location related information ("remembered" locations) and trigger or action information. The terminal also includes a position-monitoring function that compares one or more "remembered" locations with current location information.

Once the user selects to program a reminder 205, the terminal may request the user to describe the reminder according to one or more parameters 210. Optionally the terminal may allow the user to quickly select a default set of parameters. Examples of parameters include specifying a text reminder message to be displayed or selecting a sound to be played.

The user may be prompted to use a stored location or the current location. Alternatively, as shown in FIG. 2, by default the current location information is stored 215. A mobile terminal can use location information such as base station ID, neighbor list, CDMA pilot PN offset, multi-path signal conditions or other signal conditions, GPS, FLT (AFLT or EFLT or other), or any other location identifying information. Note that it is not necessary for a location to be physically or geographically described by the information. It is only necessary that information allow the terminal to recognize whether or not it has left or returned to the same location. If the location information does describe a geographical area, then a set area may be defined in several ways: a point with a radius, network parameters, a geographic geometric shape, etc. It is also not necessary that the mobile knows the exact location or that the mobile tells the user what the location is as long as it can store and recognize it. The location area characteristics may be settable by the user or be adapted according to the precision, accuracy or availability of location information.

The terminal also stores the location reminder trigger and action information and a reference to the current location 220. The terminal then monitors 225 the current location until it is outside of the "set" location area. For example, the terminal monitors the current location information and detects when the terminal has handed-off to another base-station or has exceeded a pre-set distance from the stored location. The mobile may detect that it is has transitioned out of the area described by the stored location information or that the current location matches the stored location information 230 but the direction of travel may also be checked 235. For example, in the case where the mobile terminal is transitioning to an area outside the location described by the stored information, i.e. exiting the location, it may not trigger the stored action but rather return to continue monitoring 225. The mobile terminal may then continue monitoring until the current location again matches or is similar to the stored location.

The mobile may monitor the current location periodically, whenever a significant change occurs, whenever a certain pre-programmed change occurs, whenever a call is made, a handoff occurs or any system conditions change.

The mobile terminal monitors the current location and triggers the stored action when it detects that it has reentered the vicinity of the stored-location, i.e. entering the location described by the stored location information. The action is triggered 240 when both the location matches 230 the stored location and the direction matches the stored trigger information 235. Direction may be described, for example, as either entering a defined stored location or as exiting a defined stored location. A practical example of using this is a person who, while driving to work, wants to program a reminder for himself/herself to run an errand after work. The user would program the reminder action such as a voice memo to be played and select his/her office location as well as specify that the reminder should trigger only when exiting the office.

If the user programs the reminder to recur or repeat then the process returns to continue monitoring 225.

Figure 3:
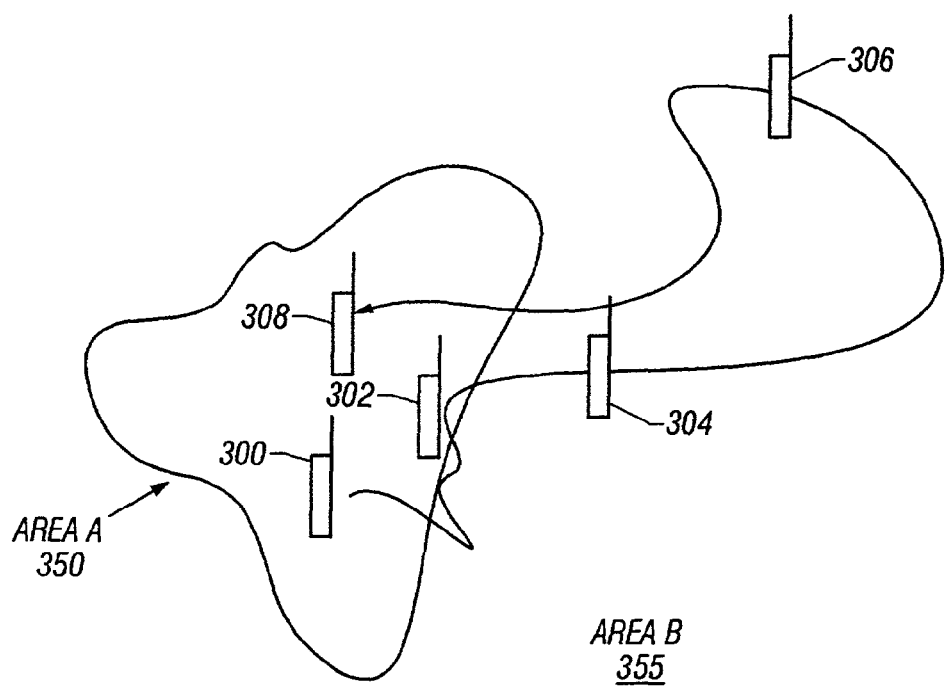
FIG. 3 is a diagram of a roaming mobile station for use in a wireless communication system illustrating monitoring and triggering of a location reminder according to one embodiment of the present invention.

FIG. 3 is a diagram of a roaming mobile station for use in a wireless communication system illustrating monitoring and triggering of a location reminder according to one embodiment of the present invention. FIG. 3 shows a mobile terminal 300 that roams from inside Area A 350 to the border of Area A 350, then to Area B 355 (outside Area A) and then returns into Area A 350 at some later time. A reminder can be programmed in Area A 350 when the mobile terminal is at location 300. The invention monitors the current location information compared to the stored reminder location information. The mobile terminal may use techniques to prevent inappropriate triggering of the reminder action upon detecting the short transitions across the border between Area A and B around location 302. The mobile may use hysteresis, delay, or other means to transition between leaving/entering a stored location area. The transition may be based on proximity, distance, time, time delay, signal conditions, environment, user actions, current network parameters (base station ID, pilot, system, network ID, etc) or other location or time based method.

The mobile terminal may therefore consider itself outside Area A only once it has reached location 304. At this time the mobile terminal can check if any stored location information or triggers match the condition that occurred, i.e. that it exited Area A 350. If a stored reminder matches this information then it is triggered and the associated action is executed. Since a reminder was stored with location 300, when the mobile terminal returns to Area A 350 at location 308, for example, the action associated with that stored reminder is executed.

Figure 4:
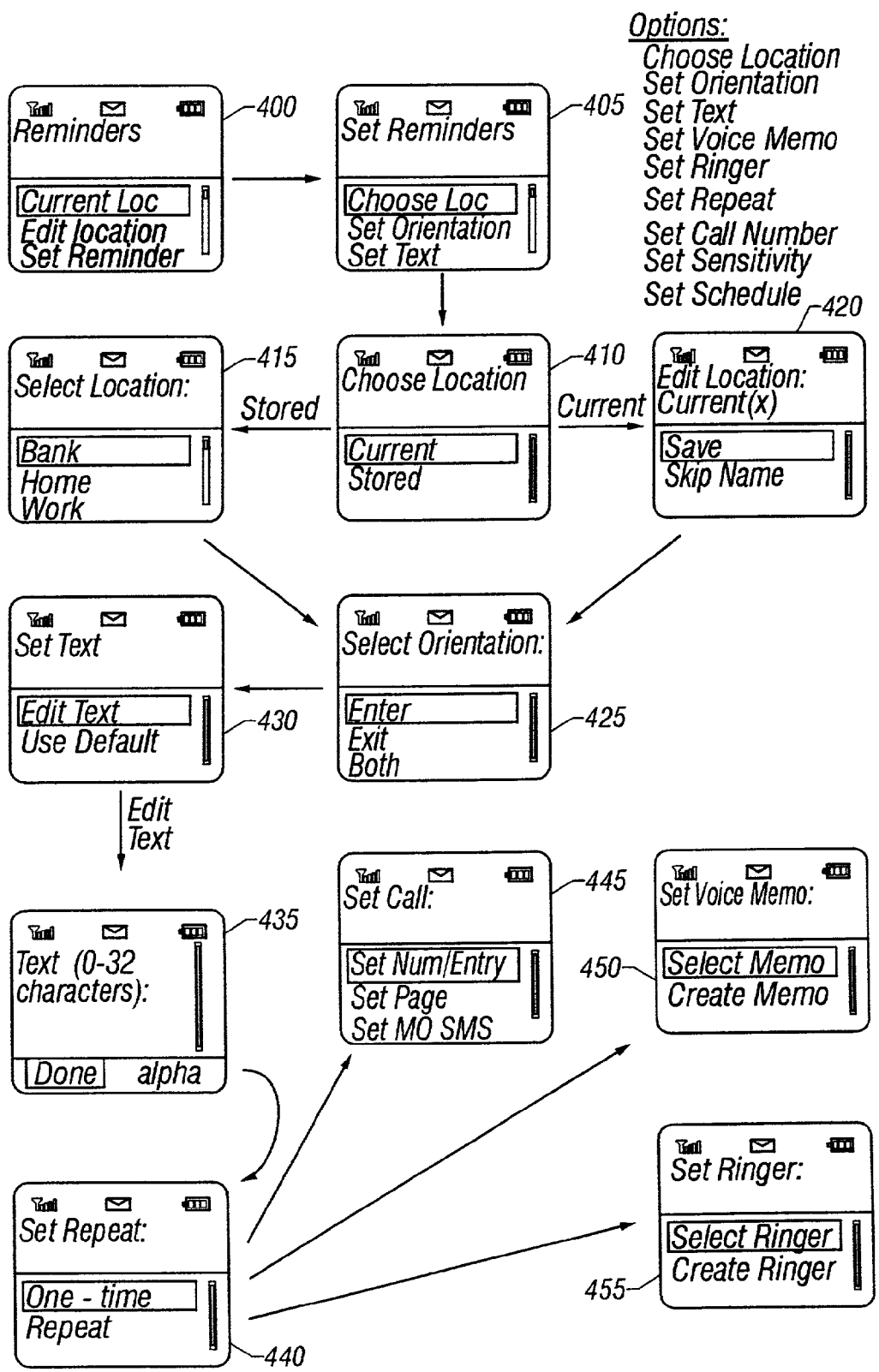
FIG. 4 is a user interface design diagram showing an embodiment of user programming of location reminders.

FIG. 4 is a user interface design diagram showing one embodiment of user programming of location reminders. In the main reminder screen 400 the user may select to enter a new reminder or store information about a new location (the current location for example). If the user selects to set a reminder then the mobile terminal screen 405 is displayed. At this point the user may select from one or more options of actions to be executed when the reminder is triggered. Examples of options include but are not limited to setting or selecting a text message, setting, recording or selecting a voice memo or voice message recording, setting or selecting a ringer, or selecting a number to be dialed or called. The user may also select to describe the context information that describes the trigger of the reminder. This may include, for example, selecting a time and date, choosing location information or orientation/direction or trigger sensitivity. The user may also select to have the reminder repeating or recurring.

If the user selects to choose a location then screen 410 is displayed. The user may then select a location that has already been stored or the current location. Having selected a stored location, the user may then select the specific stored location information 415. The mobile terminal may allow the user to store locations without alerts that can be used later. For example, a user may store a location "work" when he/she is at work so that this tag can be easily associated with a reminder at a later time, perhaps repeatedly or on different occasions and for different purposes.

Alternatively the user may select the current location and provide a text name to be associated with it 420. Optionally, the user may then be able to select the orientation of the location trigger. For example, the user may select that the reminder be triggered only when exiting the region, entering the region or in both cases 425. Alternatively the user may select from a sequence of events such as $2^{nd}$ time entering the region. The user may also select to be reminded only upon leaving an area or entering an area independently or exclusively. For example, a user may set an alert to remind him/her to go to an appointment after leaving a meeting.

FIG. 4 shows some embodiments of the invention where the reminder action takes the form of display of a text message and either a voice memo play-back 450, call to a number 445, or playing a ringer 455. In the case of a call, the terminal may allow the user to select the number to be called or a phone book entry, set the reminder to page a number with a numeric message (with specific or default text), set the reminder to send a mobile-originated short message sequence (SMS) message to a number upon triggering, or set the reminder to go to a specific URL page upon triggering. Examples of using the latter option include downloading a stock quote list, getting meeting notes, or downloading an advertisement.

The user is able to enter the text message in screen 435 if desired according to a selection made in screen 430 or use a default message. The user is then able to select whether the reminder is repeated or not in screen 440. The user actions may be repeatable so that a user is reminded every time he/she enters or leaves a stored location. The accuracy or precision of locations may be improved with time through updates. Location precision and accuracy can be improved through multiple measurements or through refinement of the measurements. Determining improved location fixes using multiple measurements such as by averaging multiple measurements or fixes is well known in the art. Similarly, refining measurements by narrowing down search windows for satellite signals or eliminating possibilities in ambiguity searches are also well known in the art.

Location dependent actions may also be dependent on a time schedule. For example the user may program a reminder to remind him or her when he or she leaves work every weekday. Actions may also be associated with other conditions such as the active number assignment module (NAM). If a device or user has multiple phone numbers, the user may want to associate certain reminders or actions only when particular phone numbers are active or in use.

There are numerous variations, modifications and different procedural orderings of the present invention will become readily apparent to those skilled in the art. Accordingly, the invention may be embodied in other specific forms without departing from its spirit or essential characteristics.

What is claimed is:

1. A method of providing a terminal with location-based actions in a communications network comprising:
    storing at least a first set of location information;
    associating a terminal action with said first set of location information; and
    executing the associated terminal action when a current terminal location information is within a specified range of the first set of location information;
    applying to a comparison between the current terminal location information and the first set of location information a step selected from the group consisting of hysteresis, delay, proximity threshold, distance threshold, signal condition change threshold.

2. The method of claim 1, further comprising:
    defining a direction specification associated with said terminal action,
    comparing said terminals direction of motion relative to said first set of location information with said direction specification associated with said terminal action,
    executing said terminal action only if said direction specification matches with current terminal direction of motion relative to said stored first set of location information.

3. The method of claim 2, wherein said direction specification parameter is selected from the group consisting of exiting, entering, and both entering and exiting.

4. The method of claim 2, further comprising applying hysteresis to direction changes to avoid thrashing.

5. The method of claim 1 wherein said first set of location information is the current location information of said terminal when the user is associating said terminal action.

6. The method of claim 1, wherein associating said terminal action with a set of location information is done after storing said location information.

7. The method of claim 1, further comprising:
  associating a description with each set of stored location information; and
  selecting a stored set of location information to associate with said action based on the associated description.

8. The method of claim 1, wherein said location information consists of at least one of the elements selected from the group consisting of base station identifier, pilot signal strength, pilot signal Pseudo Noise offset, multi-path profile, signal conditions, location identification, location name and area name.

9. The method of claim 1, further comprising determining said location information without an active connection to said network.

10. The method of claim 1, wherein said location information is represented using at lest one of the parameters selected from the group consisting of radius, network parameter, geometric shape, size, range, orientation, and height.

11. The method of claim 1, further comprising:
  obtaining time information;
  associating said action with both said first set of location information and said time information; and
  executing said stored terminal action only if said time information matches a current time.

12. A mobile terminal providing location-based actions for use in a communications network comprising:
  a memory which stores at least a first set of location information;
  a processor which associates a terminal action with said first set of location information and executes the associated terminal action when a current terminal location information is within a specified range of the first set of location information; wherein
  the processor further applies to a comparison between the current terminal location information and the first set of location information a step selected from the group consisting of hysteresis, delay, proximity threshold, distance threshold, signal condition change threshold.

13. The mobile terminal of claim 12, wherein the processor further defines a direction specification associated with said terminal action and compares said terminals direction of motion relative to said first set of location information with said direction specification associated with said terminal action, then executes said terminal action only if said direction specification matches with current terminal direction of motion relative to said stored first set of location information.

14. The mobile terminal of claim 13, wherein said direction specification parameter is selected from the group consisting of exiting, entering, and both entering and exiting.

15. The mobile terminal of claim 13, wherein the processor applies hysteresis to direction changes to avoid thrashing.

16. The mobile terminal of claim 12, wherein said first set of location information is the current location information of said terminal when the user is associating said terminal action.

17. The mobile terminal of claim 12, wherein the processor associates said terminal action with a set of location information after storing said location information.

18. The mobile terminal of claim 12, wherein the processor further associates a description with each set of stored location information and selects a stored set of location information to associate with said action based on the associated description.

19. The mobile terminal of claim 12, wherein said location information consists of at least one of the elements selected from the group consisting of base station identifier, pilot signal strength, pilot signal Pseudo Noise offset, multi-path profile, signal conditions, location identification, location name and area name.

20. The mobile terminal of claim 12, wherein the processor further determines said location information without an active connection to said network.

21. The mobile terminal of claim 12, wherein said location information is represented using at least one of the parameters selected from the group consisting of radius, network parameter, geometric shape, size, range, orientation, and height.

22. The mobile terminal of claim 12, wherein the processor further obtains time information and associates said action with both said first set of location information and said time information, wherein the processor executes said stored terminal action only if said time information matches a current time.

* * * * *